July 19, 1932.  F. L. WILLIAMS  1,868,039
SPIRAL PIPE MACHINE
Original Filed May 22, 1922  2 Sheets-Sheet 1
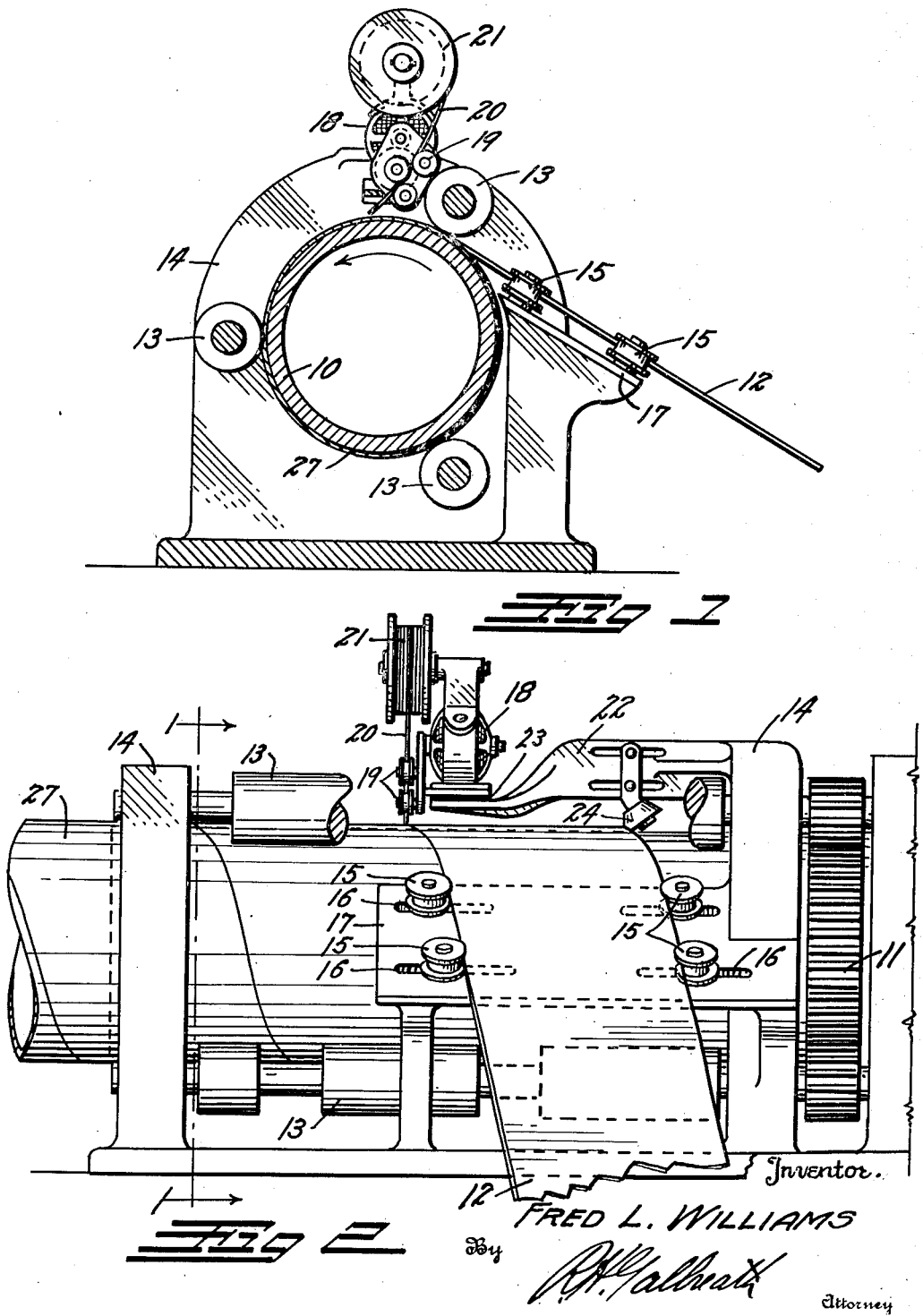

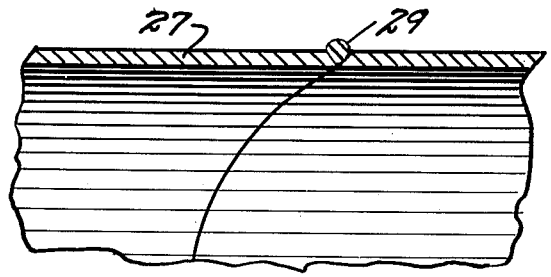
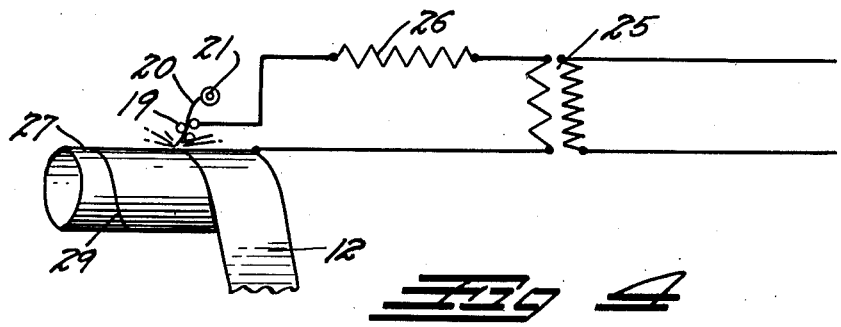
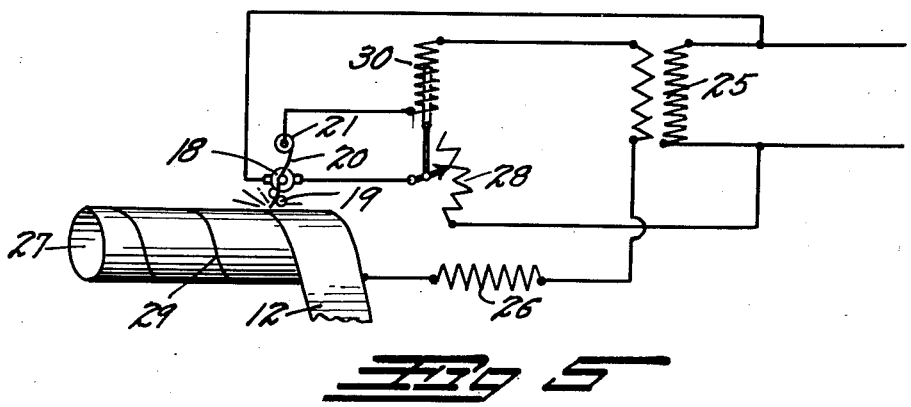
Inventor
FRED L. WILLIAMS
Attorney Patented July 19, 1932

1,868,039

UNITED STATES PATENT OFFICE

FRED L. WILLIAMS, OF DENVER, COLORADO, ASSIGNOR TO THE AMERICAN ROLLING MILL COMPANY, OF MIDDLETOWN, OHIO, A CORPORATION OF OHIO

SPIRAL PIPE MACHINE

Original application filed May 22, 1922, Serial No. 562,701. Divided and this application filed August 18, 1930. Serial No. 475,920.

This invention relates to a machine for continuously forming a spiral wrapped, butt-welded, sheet metal pipe from a single continuous strip of sheet metal and more particularly to the machine shown in co-pending application, Serial No. 562,701, filed May 22, 1922.

The principal object of this invention is to provide a machine which will continuously wrap a relatively long single sheet of metal in a closed spiral with abutting edges and simultaneously and continuously weld the edges together as the spiral is formed.

Another object of the invention is to so construct the machine that various widths of sheet metal may be employed in forming of the spiral.

A further object of the invention is to provide a machine which will be substantially automatic in operation and which will not require the constant attention of an operator.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a cross section through the machine taken on the line 1—1, Fig. 2.

Fig. 2 is a side elevation of the machine partly broken away.

Fig. 3 is a detail sectional view of the joint in the pipe as produced by this machine.

Fig. 4 is a diagram of an electric circuit which may be used with the machine.

Fig. 5 is a diagram of a second circuit which may be used with the machine when it is desired to have the welding portion thereof operate automatically.

The pipe and process form no part of the present application but have been incorporated in Serial No. 562,701, supra, of which, the present application is a division.

The machine comprises an internal mandrel 10 substantially equal in diameter to the inside diameter of the pipe desired. The mandrel 10 may be rotated by means of a spur gear 11 mounted thereon or in any other suitable manner.

A strip of sheet metal 12 is fed around the mandrel 10 at an angle to the axis thereof, the angle being determined by the position of a series of guide rollers 15, which are adjustable in slots 16 in an angle plate 17. The adjustment of the guide rollers 15 depends upon the diameter of the pipe to be rolled and the width of the strip of sheet metal used. The adjustment should be such that it will cause the edge of the oncoming portion of the strip 12 to abut the edge of the previously rolled portion and so that it will also bring the joint in the proper position for welding as will be later described.

Positioned above the mandrel 10, is a motor 18 which drives a series of rollers 19, adapted to force a strip of welding metal 20 downwardly toward the mandrel 10. The welding metal 20 feeds from a reel 21, positioned above the motor 18. The motor 18 is supported from the frame 14 by means of a bracket arm 22, from which, it is electrically insulated by means of suitable insulation 23.

An adjustable roller 24 is mounted in slots in the bracket arm 22 and rides against the edge of the incoming strip 12. The roller 24 is so adjusted as to keep the first joint of the pipe constantly under the point of the welding metal 22. The roller 24 acts to constantly force the finished pipe, 27, off the end of the mandrel 10. It has been found to be preferable to weld the pipe at the first joint, as indicated in the drawings, since this prevents any subsequent spreading of the joint as it passes around the mandrel. However, in some installations it might be desirable to accomplish the welding at the second or third joint.

An electric current is caused to flow from a transformer 25, or other source, through a suitable resistance 26 to the welding metal 20, from whence it arcs across to the pipe 27 so as to fuse the welding metal and the two abutting edges together. From the pipe 27 the current returns through the frame of the machine to its source 25. The motor 18 is so adjusted as to supply the welding metal 20 at the proper speed to continuously maintain an arc upon the constantly moving, abutting edges. A plurality of rolls are interspaced about the mandrel 10, the sheet or strip 12 passing between these rolls and the mandrel. The function of the rolls 13 is to hold the strip down adjacent to the mandrel and to assist in the bending and forming thereof into the desired cylindrical shape. The rolls 13 may be driven, if desired, as is shown in Figure 2.

In Fig. 5 is shown a method for automatically controlling the arc. An electro-magnet 30 is introduced in series with the arc circuit. The armature of the electro-magnet 30 controls a variable resistance 28 in the power circuit of the motor 18, so that should the arcing distance be widened for any reason or should the arc become extinguished, the electro-magnet 30 will cut down the resistance 28 and speed up the motor 18 so as to bring the arc to its proper spacing.

With this system the process is practically automatic. The machine being properly adjusted, and started it will operate without attention as long as supplied with sheet metal, welding metal and electricity.

It is desired to call attention to the joint formed by this machine, which is shown in detail in Fig. 3. In this view the portion of the metal which has been in a state of fusion is shown in heavy hatching. It will be noted that the interior of the pipe is perfectly smooth at the joint so as to offer no resistance to flow through it. The outer surface contains a small bead 29, which runs spirally around the pipe at the joint. The bead 29 is caused by the addition of the welding metal 20 to the metal of the pipe. The bead 29, because of its spiral position, acts as a reinforcement to the entire length of pipe.

With the use of this machine there is no overlapping at the joint to obstruct the flow and, since the sheet metal is heated only at its extreme edge, there is no objectionable expansion or contraction to cause buckling or distortion. The pipe is formed at a continuous speed.

The term "sheet metal" as used herein is not in any way to be construed as limiting the thickness or gauge of the metal. The machine is equally applicable to the heavy gauge material usually referred to as "plates" and having a thickness of one-quarter inch or more.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A machine for forming spiral, butt-welded pipe from a continuous strip of sheet metal comprising: a rotating mandrel; substantially as large as the internal diameter of the pipe to be formed; means for feeding a continuous strip of sheet metal onto said mandrel at an angle to the axis thereof so that the edge of the oncoming strip will lie in the same plane as the strip previously rolled; means for holding said metal to the surface of said mandrel, said means comprising rolls interspaced about said mandrel and means for continuously welding the edge of the oncoming strip to the edge of the strip previously rolled as said spiral is formed.

2. A machine for forming spiral, butt-welded pipe from a continuous strip of sheet metal comprising: a rotating mandrel substantially as large as the internal diameter of the pipe to be formed; means for feeding a continuous strip of sheet metal onto said mandrel at an angle to the axis thereof so that the edge of the oncoming strip will lie in the same plane as the strip previously rolled; means for holding said metal to the surface of said mandrel, said means comprising rolls interspaced about said mandrel and means for continuously welding the edge of the oncoming strip to the edge of the strip previously rolled as said spiral is formed; and means for constantly forcing said spiral from said mandrel so that the line of contact between said edges will be maintained under said welding means.

3. A machine for forming spiral, butt-welded pipe from a continuous strip of sheet metal comprising: a forming mandrel substantially as large as the internal diameter of the pipe to be formed; means for feeding a continuous strip of sheet metal at an angle to said forming device so as to form a continuously advancing spiral; means for rotating said mandrel forming members adapted to contact with the exterior of said spiral so as to force it into cylindrical formation; said forming members comprising rolls interspaced about said mandrel; means for driving said rolls and means for continuously maintaining an electric arc over the continuously abutting edges of said advancing spiral.

In testimony whereof, I affix my signature.

FRED L. WILLIAMS.